(12) United States Patent
Dunjic et al.

(10) Patent No.: US 11,120,165 B2
(45) Date of Patent: Sep. 14, 2021

(54) SYSTEMS AND METHODS FOR MANAGING A DATA REQUEST INTERFACE

(71) Applicant: The Toronto-Dominion Bank, Toronto (CA)

(72) Inventors: Milos Dunjic, Oakville (CA); David Samuel Tax, Toronto (CA); Arthur Carroll Chow, Markham (CA); Peter Glen Nairn, Cobourg (CA); Edward James Hood, Toronto (CA); Martin Albert Lozon, London (CA); John Jong-Suk Lee, Toronto (CA); Arun Victor Jagga, Toronto (CA)

(73) Assignee: The Toronto-Dominion Bank, Waterloo (CA)

( * ) Notice: Subject to any disclaimer, the term of this patent is extended or adjusted under 35 U.S.C. 154(b) by 141 days.

(21) Appl. No.: 15/964,412

(22) Filed: Apr. 27, 2018

(65) Prior Publication Data

US 2019/0332808 A1 Oct. 31, 2019

(51) Int. Cl.
| | |
|---|---|
| *G06F 21/62* | (2013.01) |
| *G06Q 40/02* | (2012.01) |
| *H04L 9/32* | (2006.01) |
| *H04L 29/06* | (2006.01) |
| *G06F 21/44* | (2013.01) |

(52) U.S. Cl.
CPC .......... *G06F 21/6263* (2013.01); *G06F 21/44* (2013.01); *G06Q 40/02* (2013.01); *H04L 9/3213* (2013.01); *H04L 63/10* (2013.01)

(58) Field of Classification Search
CPC .. G06F 21/44; G06F 21/6263; G06F 21/6245; G06Q 40/02; H04L 63/10; H04L 9/3213; H04L 63/08; H04L 9/3226
See application file for complete search history.

(56) References Cited

U.S. PATENT DOCUMENTS

| | | | |
|---|---|---|---|
| 7,072,354 B1 * | 7/2006 | Beathard | H04L 63/10 370/447 |
| 7,319,987 B1 | 1/2008 | Hoffman et al. | |
| 8,756,131 B1 | 6/2014 | Pariante et al. | |
| 9,026,661 B2 | 5/2015 | Swildens et al. | |
| 9,224,168 B2 | 12/2015 | Thirumalai et al. | |

(Continued)

*Primary Examiner* — Olugbenga O Idowu
(74) *Attorney, Agent, or Firm* — Rowand LLP

(57) ABSTRACT

A computer system and method for managing a data request interface. The system includes a memory associated with the data request interface and coupled to a processor. The memory includes processor-executable instructions of the method for managing the data request interface. The method includes: receiving, from a first client device, a first signal including a primary authorization credential associated with a data record and a second signal including a request to generate an alternate authorization credential for use by a software module. The alternate authorization credential is associated with data retrieval constraints. The method includes generating the alternate authorization credential and configuring the data request interface to impose the data retrieval constraints for constraining data operations on the data record upon receipt of the alternate authorization credential. The method further includes sending, to the first client device or a second client device, a third signal including the alternate authorization credential.

20 Claims, 7 Drawing Sheets

(56) References Cited

U.S. PATENT DOCUMENTS

| | | |
|---|---|---|
| 9,268,971 B2 | 2/2016 | Allen et al. |
| 9,608,970 B1 * | 3/2017 | Gehret .................. H04L 63/062 |
| 9,647,937 B1 | 5/2017 | Dukes et al. |
| 9,805,179 B2 | 10/2017 | McEwen et al. |
| 2002/0073416 A1 * | 6/2002 | Ramsey Catan .. H04N 21/4415 |
| | | 725/6 |
| 2007/0192248 A1 * | 8/2007 | West ...................... G06Q 40/02 |
| | | 705/42 |
| 2009/0240907 A1 * | 9/2009 | Crandell ................. G06F 21/78 |
| | | 711/163 |
| 2013/0263226 A1 | 10/2013 | Sudia |
| 2014/0046820 A1 | 2/2014 | Sunderji et al. |
| 2015/0178693 A1 | 6/2015 | Solis |
| 2016/0212060 A1 * | 7/2016 | Holcombe .......... H04L 67/2842 |
| 2018/0349643 A1 * | 12/2018 | Kunjachan .......... G06F 21/6245 |

\* cited by examiner

SYSTEMS AND METHODS FOR MANAGING A DATA REQUEST INTERFACE

TECHNICAL FIELD

The present application relates to data record systems and, in particular, devices and methods for managing a data request user interface.

BACKGROUND

Data records which are stored at a data center or networked computer may sometimes be accessible to an individual or user that is associated with such data records. For example, a user may be associated with a credential, such as a username or password, which allows the user to access such data records. Third party systems are sometimes used by such users to analyze, collect, or interpret such data records. The user may sometimes share their credentials with such third party systems to allow the third party systems to access the data records directly.

Sharing of credentials with such third parties may cause a number of problems. For example, security concerns may arise for a number of reasons. For example, the third party system typically stores the credentials in an electronic format making the credentials potentially vulnerable to malicious actors, such as hackers. Additionally or alternatively, the third party system, in accessing the data records, may strain the resources associated with the data center or networked computer that provides access to the data records such that direct users are negatively impacted when trying to access their data records. For example, because the third party access to data records may strain resources associated with the data center or networked computer, such direct users may experience delayed or lagging response when these direct users attempt to access data records through a data request interface associated with the data center or networked computer.

BRIEF DESCRIPTION OF THE DRAWINGS

Embodiments are described in detail below, with reference to the following drawings.

Like reference numerals are used in the drawings to denote like elements and features.

DETAILED DESCRIPTION OF VARIOUS EMBODIMENTS

Figure 1:
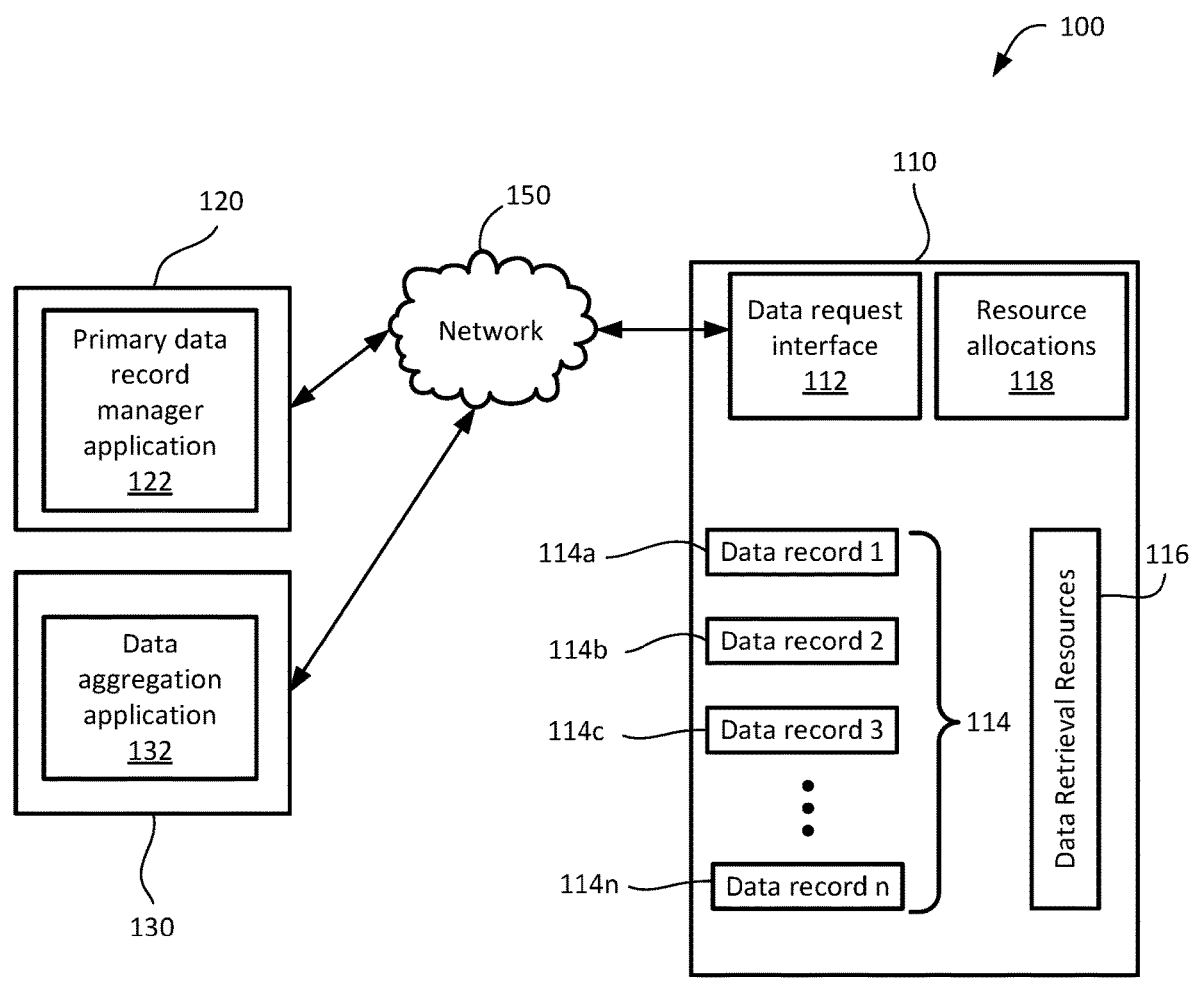
FIG. 1 illustrates, in block diagram form, a system for managing data records, in accordance with an example of the present application.

In one aspect, the present application describes a system for managing a data request interface. The system includes a communications module for communicating over a network; a processor coupled to the communications module; and a memory associated with the data request interface and coupled to the processor. The memory stores processor-executable instructions that, when executed, cause the processor to: receive, from a first client device and via the communications module, a first signal including a primary authorization credential associated with a data record; receive, from the first client device and via the communications module, a second signal including a request to generate an alternate authorization credential for use by a software module associated with a second client device, the alternate authorization credential to be associated with data retrieval constraints; generate the alternate authorization credential; configure the data request interface to impose the data retrieval constraints for constraining data operations on the data record upon receipt of the alternate authorization credential from the second client device; and send via the communications module to at least one of the first client device and the second client device a third signal including the alternate authorization credential.

In another aspect, the present application describes a computer-implemented method for managing a data request interface. The method includes: receiving, from a first client device, a first signal including a primary authorization credential associated with a data record; receiving, from the first client device, a second signal including a request to generate an alternate authorization credential for use by a software module associated with a second client device, the alternate authorization credential to be associated with data retrieval constraints; generating the alternate authorization credential; configuring the data request interface to impose the data retrieval constraints for constraining data operations on the data record upon receipt of the alternate authorization credential from the second client device; and sending to at least one of the first client device and the second client device a third signal including the alternate authorization credential.

In another aspect, a non-transitory computer-readable storage medium storing processor-executable instructions that, when executed, cause a processor to carry out the operations of one or more methods described herein.

Other aspects and features of the present application will be understood by those of ordinary skill in the art from a review of the following description of examples in conjunction with the accompanying figures.

In the present application, the term "and/or" is intended to cover all possible combinations and sub-combinations of the listed elements, including any one of the listed elements alone, any sub-combination, or all of the elements, and without necessarily excluding additional elements.

In the present application, the phrase "at least one of . . . or . . . " is intended to cover any one or more of the listed elements, including any one of the listed elements alone, any sub-combination, or all of the elements, without necessarily excluding any additional elements, and without necessarily requiring all of the elements.

Reference is made to FIG. 1, which illustrates, in block diagram form, a system 100 for managing data records and a data request user interface. The system 100 may include a data record server 110, a primary client device 120, and an aggregator client device 130. Although the data record server 110 is illustrated in FIG. 1 as a single server, the data record server 110 may be multiple servers, a server farm, or any other such arrangement of computing devices to implement server-like functionality. The data record server 110 may include one or more processors and memory.

The data record server 110 may be a data record server for a particular entity or organization, such as an engineering company, a financial institution, a data cloud server, or the like.

The data record server 110 may be a data record server for a financial institution and the system 100 may include more than one data record servers, such that each individual record server may represent a separate financial institution or service (e.g., a retail bank institution, a credit card providing institution, an investment providing institution, etc.). As will be described in some examples herein, the primary client device 120 may be associated with one or more data records at each of one or more data record servers. For example, the primary client device 120 may be associated with a user or account having one or more data records associated therewith. For example, the primary client device 120 may be associated with a first data record with a retail bank, a second data record with a credit card providing institution, a third data record with an investment providing institution, etc.

The data record server 110 may include a plurality of data records 114 (illustrated individually as 114*a*, 114*b*, 114*c*, . . . 114*n*). The plurality of data records 114 may be provided in a database. The individual data records 114 may be associated with a distinct client device. The data records 114 may be characterized as data structures and may include unique identifiers for identifying the data records or for identifying one or more client devices associated with a particular data record. In some examples, the data records 114 may be account holder records. Account holder records may include, among other information, details relating to name, address, contact information, monetary account balances of a bank account, detailed listing of account transactions, or the like.

The data records 114 may be associated with a respective primary authorization credential. For example, a first data record 114*a* (associated with a first account/user) may be associated with a first primary authorization credential. A second data record 114*b* (associated with a second account/user) may be associated with a second primary authorization credential. A third data record 114*c* (associated with a third account/user) may be associated with a third primary authorization credential. In some examples, a primary authorization credential may include an alphanumeric password and, in at least some embodiments, an identifier such as a personal account number (PAN), although other types of authorization credentials are contemplated. For example, the primary authorization credential may be a signed authentication token for token-based authentication, a biometric input from an account holder associated with a data record, or other unique authorization token. When the data record server 110 receives a primary authorization credential from a client device, the data record server 110 may identify a data record associated with that primary authorization credential and may accept data operation requests on that identified data record.

The data record server 110 may include a data request interface 112. In some examples, the data request interface 112 may be a data request user interface for providing data from data records to a user of a client device. In some examples, the data request interface 112 may be associated with a memory, and the memory may store processor-executable instructions for displaying aspects of a user interface such that data from data records may be accessible to a user of a respective client device, in accordance with operations described herein.

The data record server 110 may include data retrieval resources 116. The data retrieval resources 116 may include, for example, computing resources such as processor cycles, allocable memory, network bandwidth, or the like. In some examples, the data retrieval resources 116 may be assigned to particular data records 114. As will be described in some examples herein, data retrieval resources 116 may be dynamically assigned to particular data records 114 in response to determining that the data retrieval resources 116 may be deficient. In some other examples, data retrieval resources 116 may be statically assigned upon creation of respective data records. For example, respective data records may be assigned allocated memory for storing data of respective data records.

The data record server 110 may include resource allocations 118. The resource allocations 118 may include associations between data records 114 and associated authorization credentials. In some examples, the resource allocations 118 may also include associations between data records 114 stored on the data record server 110 and data retrieval resources 116.

The data record server 110 may include a communications module coupled to one or more processors for communicating over a network 150. The data record server 110 may be configured to communicate over the network 150 with client devices, such as the primary client device 120 or the aggregator client device 130. The network 150 may include a plurality of interconnected wired and wireless networks, including the Internet, wireless local area networks, wireless area networks, and the like.

The client devices, such as the primary client device 120 or the aggregator client device 130, may be computing devices having one or more processors, memory, and network communication capabilities. In some examples, the client devices may be a mobile device, such as a smartphone or a tablet, a personal computer, a desktop computer, a smartwatch or wearable computing device, or any similar computing device.

In some examples, the data request interface 112 may be a graphical user interface and may also be configured to receive data operation commands from client devices. In some examples, the data request interface 112 may provide an application interface for communicating with client devices that request access to data records 114 or that initiate modifications to data records 114. As will be illustrated with examples described herein, the data request interface 112 may be configured to receive a request from the aggregator client device 130 to read data from the data records 114. The request that is received from the aggregator client device 130 may include a primary or an alternate authorization credential that may be associated with a particular data record. In other examples, the data request interface 112 may be configured to receive a request from the primary client device 120 to transfer or modify data of the data records 114. The data records 114 may be account holder records at a financial institution (e.g., a retail bank) and the data request interface 112 may receive a first primary authorization credential and a request to transfer units of value associated with the first data record 114*a* to another of the data records 114 (or to another data record associated with a different server), or otherwise perform data operations with the first data record 114a. In some examples, the data request interface 112 may be configured to ensure that an authorized client device of a particular data record may retrieve information regarding that particular data record or to perform data operations with respect to that particular data record. To do so, the data record server 110 and the data request interface 112 may be configured to implement various security, authentication, or verification protocols to ensure that communications between the data record server 110 and client devices are authenticated or validated before granting any access or data operation privileges.

The primary client device 120 may store and execute a primary data record manager application 122 for connecting with the data record server 110 and interacting with the data request interface 112. As will be described in examples herein, the primary data record manager application 122 may transmit a primary authorization credential to the data record server 110 for authorizing the primary client device 120 at the data record server 110. The data request interface 112 may permit data operations on the first data record 114a in response to data operation requests received from the primary client device 120. In addition, the data request interface 112 may receive a request to generate alternate authorization credentials for use by a software module associated with another client device, such as the aggregator client device 130. Example operations of the primary data record manager application 122 will be described herein.

The aggregator client device 130 may store and execute a data aggregation application 132 for connecting with the data record server 110 and interacting with the data request interface 112. The aggregator client device 130 may be a third-party client device providing a service to the primary client device 120. For example, the primary client device 120 may delegate to the aggregator client device 130 responsibilities for data collection, and the aggregator client device 130 may collect data from data records residing at one or more data record servers and may deduce or extract insight from datasets collected from data records at the one or more data servers. In some examples, the data record server 110 may implement security, authentication, and verification operations to grant read or modify operations on data records 114 upon receiving an authorization credential from a client device. Thus, when the primary client device 120 delegates to the aggregator client device 130, the primary client device 120 may share the primary authorization credential with the aggregator client device 130 such that the aggregator client device 130 may transmit the primary authorization credential to the data record server 110 for accessing the first data record 114a on behalf of the primary client device 120.

Because the primary authorization credential may be associated with the first data record 114a, and the first data record 114a may include confidential or otherwise sensitive information associated with the primary client device 120, in some examples, sharing the primary authorization credential with the aggregator client device 130 may contribute to potential risks of data breaches of data records stored at the data record server 110. Further, in some examples, numerous client devices may delegate to the aggregator client device 130 responsibilities for data collection on behalf of the numerous client devices. Because the aggregator client device 130 may be responsible for data collection from numerous data records 114 stored at the data record server 110, the aggregator client device 130 may be configured to execute numerous operations for requesting access, via the data request interface 112, to numerous data records 114 stored at the data record server 110. In response, the data record server 110 may undertake numerous data retrieval resources 116 for responding to received data operation requests. Such data operation requests may be received in high numerical volumes and may encumber copious data retrieval resources 116, thereby encumbering data retrieval resources 116 from use by other operations at the data record server 110 or for use by other primary client devices associated with respective data records. Accordingly, it may be desirable to provide devices and methods for managing the data request interface 112 to minimize data breach risks associated with delegating data record access and to minimize surge demand of data retrieval resources 116.

In one aspect, an example data record server 110 may include the data request interface 112 for receiving authorization credentials from a client device and determining whether to balance demand of data retrieval resources 116.

Figure 2:
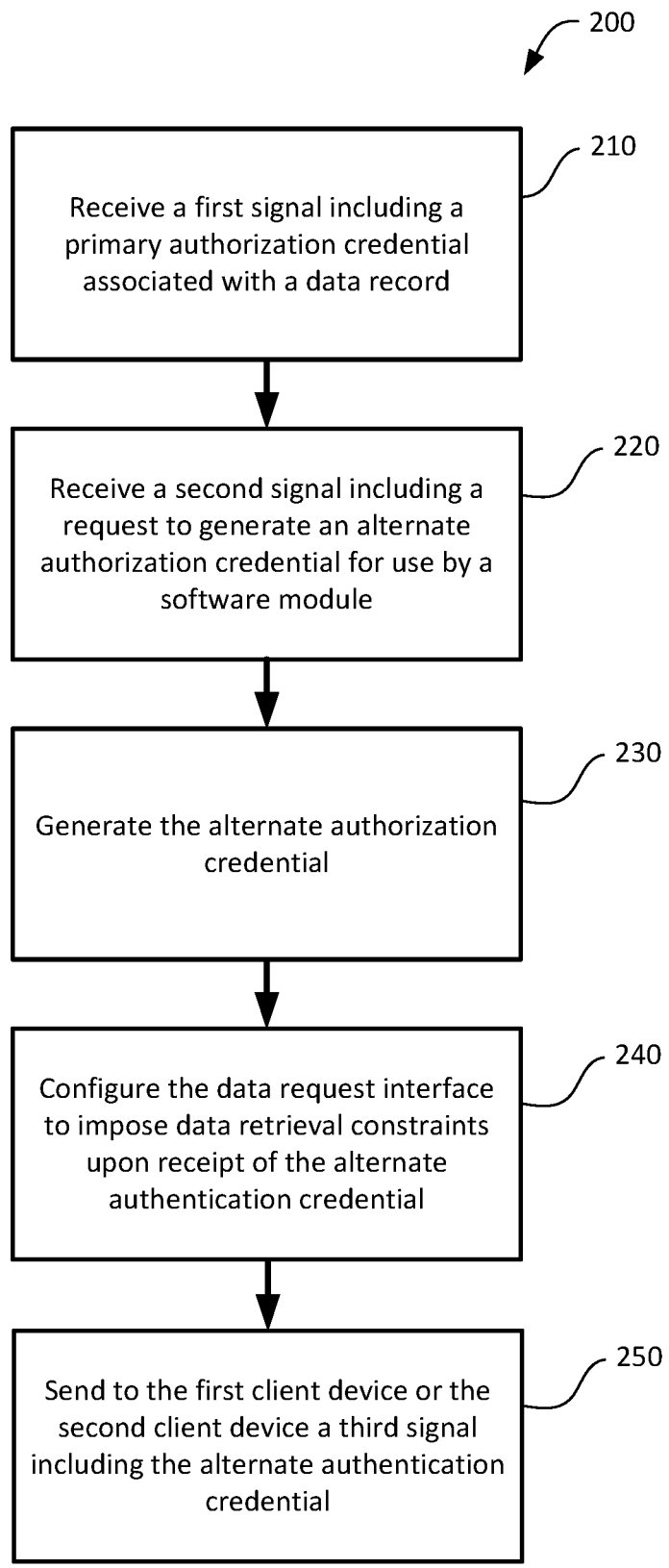
FIG. 2 illustrates, in flowchart form, a method of managing a data request interface of a data record system, in accordance with an example of the present application.

Reference is now made to FIG. 2, which illustrates, in flowchart form, a method 200 of managing the data request interface 112 (FIG. 1) of the data record server 110 of FIG. 1, in accordance with an example of the present application. The method 200 may include operations that may be carried out by one or more processors of the data record server 110. The method 200 may be implemented, at least in part, through processor-executable instructions associated with for example the data request interface 112. In some examples, one or more of the operations may be implemented via processor-executable instructions in other applications or in an operating system stored and executed on the data record server 110.

At operation 210, the processor may receive, from the primary client device 120 (FIG. 1) and via the communications module, a first signal including a primary authorization credential for authorizing the primary client device 120. Signals, such as a first signal, a second signal, a third signal, etc., described herein may include one or more data packets based on input received on a client device or may include one or more data packets received at a client device. For example, a user of the primary client device 120 may provide, via a data request interface, authorization credentials, and a data signal including the authorization credentials may be generated.

Continuing with the foregoing description, the primary authorization credential may be associated with a data record, such as a first data record 114a (FIG. 1) or any other data record. As an illustrative example, the data record server 110 may be a data record server at a retail banking institution, and the one or more data records 114 stored at the data record server 110 may be bank account records storing a list of transactions to or from that bank account record and/or storing a running bank account balance. In some examples, the data records 114 may include dataset categories, such as a personal bank account, a business bank account, investment bank account, or the like.

At operation 220, the processor may receive, from the primary client device 120 and via the communications module, a second signal including a request to generate an alternate authorization credential for use by a software module associated with the aggregator client device 130 (FIG. 1). In some examples, the software module associated with the aggregator client device 130 may be a screen scraper application or an aggregator application. A screen scraper application may, for example, capture output from the data record server 110 by mimicking input of the primary client device 120. The output may be captured from an Internet browser, a terminal access application, or other data output application. In some examples, the screen scraper application may extract data from an Internet website, where the website may be implemented using a text-based mark-up language. In some examples, an application programming interface (API) may be provided such that the screen scraper application may extract data.

Because the primary authorization credential may be associated with the first data record 114a (as described above) and because the first data record 114a may include confidential or otherwise sensitive information associated with the primary client device 120, in some examples, sharing the primary authorization credential with the aggregator client device 130 may contribute to risks of data breach. That is, by sharing the primary authorization credential, the primary client device 120 may be allowing the aggregator client device 130 to conduct a variety of data operations that would not otherwise be intended. For example, using the primary authorization credential, the aggregator client device 130 may be able to transfer value away from the account of the first data record 114, or any similar operations. Thus, at operation 220, the primary client device 120 may request that an alternate authorization credential be generated and that the alternate authorization credential be associated with data retrieval constraints. As will be described herein, data retrieval constraints may, for example, include constraints on data operations that may be performed on one or more data records.

At operation 230, the processor may generate the alternate authorization credential for transmission to the aggregator client device 130. The alternate authorization credential may be different than or unequal to the primary authorization credential. Because the alternate authorization credential may be associated with data retrieval constraints, the primary client device 120 may request that the alternate authorization credential be generated and request that the alternate authorization credential be provided to the aggregator client device 130 for delegating data collection operations to the aggregator client device 130.

In some examples described herein, once the processor generates the alternate authorization credential, the processor may transmit the generated alternate authorization credential to the primary client device 120, and the primary client device 120 may subsequently transmit the generated alternate authorization credential to the aggregator client device 130 for delegating data operations to the aggregator client device 130.

At operation 240, the processor may configure the data request interface 112 to impose the data retrieval constraints for constraining data operations on the data record associated with the alternate authorization credential upon receipt of that alternate authorization credential from the aggregator client device 130 or any other client device. For example, the data request interface 112 may impose the data retrieval constraints by limiting user interface access to data of a data record associated with the alternate authorization credential.

The data retrieval constraints may include time constraints permitting data operations on one or more data records at a specified time (e.g., during a specific window of time, which may occur daily such as during the hours of midnight to 2 AM, or before a specific time period expires such as during the next forty eight hours). In another example, the data retrieval constraints may include imposing read-only data operations on one or more data records, such that when the alternate authorization credential is received by the data record server 110, the processor may disallow data operations for altering the one or more data records. If a data record represents a bank account record, the data retrieval constraint for imposing read-only data operations may prevent the aggregator client device 130 from transferring units of value from that data record to another data record.

In some examples, the data retrieval constraints may identify a subset dataset from the data record. For example, the data record may be a bank account record for the primary client device 120, and the data record may include personal bank account details (e.g., running transaction log and running bank account balance) and business bank account details (e.g., running business transaction log and running bank account balance). Thus, example data retrieval constraints may include instructions that: (1) when the primary authorization credential is received, the processor may permit data operations for accessing both the personal bank account details and the business bank account details; and (2) when the alternate authorization credential is received, the processor may permit data operations for accessing only one of either the personal bank account details or the business bank account details, as may be defined by the data constraints. Thus, the method 200 may include instructions that, when executed, further cause the processor to receive, from the primary client device 120 and via the communications module, a selection of the subset dataset from the first data record 114a for including in the data retrieval constraint. Continuing with the foregoing example, the primary client device 120 may select the business bank account details as the subset dataset for which to impose data retrieval constraints, such that when the alternate authorization credential is received from the aggregator client device 130, business bank account details can be hidden.

In another example, the data retrieval constraints may impose a constraint based on an account type. For example, access to chequing account data may be provided while access to a savings account may be prohibited, or vice versa.

At operation 250, the processor may send via the communications module to at least one of the first client device and the second client device a third signal including the alternate authorization credential. That is, in some examples, the processor may send to the first client device the alternate authorization credential, and the first client device may subsequently transmit the generated alternate authorization credential to the second client device. In some examples, the processor may send to the second client device the alternate authorization credential. In the foregoing example, the first client device may be the primary client device 120 and the second client device may be the aggregator client device 130.

Figure 3:
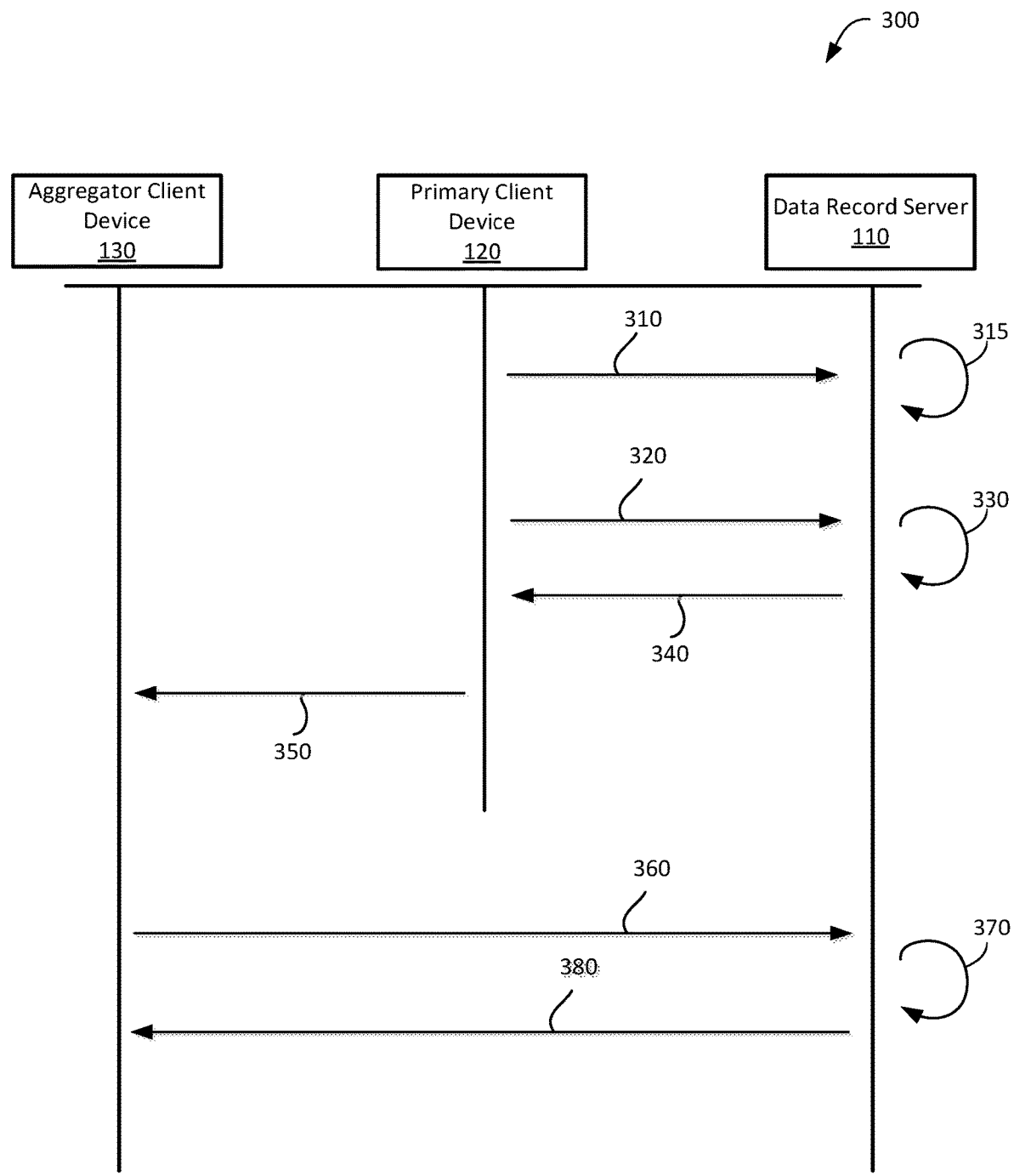
FIG. 3 illustrates a signal diagram illustrating exchanges among a data record server, a primary client device, and an aggregator client device, in accordance with an example of the present application.

Reference is now made to FIG. 3, which illustrates a signal diagram 300 illustrating exchanges among the data record server 110 (FIG. 1), the primary client device 120 (FIG. 1), and the aggregator client device 130 (FIG. 1), in accordance with an example of the present application. The data record server 110, the primary client device 120, and the aggregator client device 130 may respectively include a communications module coupled to one or more processors for communicating over the network 150 (FIG. 1). The signal diagram 300 describes operations that may be implemented, at least in part, through processor-executable instructions stored at the respective devices or servers. The operations may be carried out by one or more processors of the respective devices or servers.

At operation 310, the primary client device 120 may transmit to the data record server 110 a primary authorization credential for authorizing the first client device. At operation 315, the data records server 110 may receive the primary authorization credential and may validate the primary authorization credential and may identify a data record associated with that primary authorization credential. For example, the primary authorization credential may be associated with the first data record 114a, or any other data record 114.

At operation 320, the primary client device 120 may transmit a request to generate an alternate authorization credential for use by a software module associated with the aggregator client device 130. Although operation 210 and operation 220 are illustrated and described as separate operations, in some examples, the primary client device 120 may transmit a request to generate an alternate authorization credential concurrently with the primary authorization credential. In some examples, the primary client device 120 may further include selection of data retrieval constraints that may be associated with the first data record 114a. For example, the primary client device 120 may desire that the aggregator client device 130 access personal bank account details stored in the first data record 114a while hiding business account details stored in the first data record 114a.

At operation 330, the data record server 110 may generate the alternate authorization credential for use by the data aggregation application 132 (FIG. 1) of the aggregator client device 130. In some examples, the alternate authorization credential may be distinct from the primary authorization credential. Further, the data record server 110 may configure the data request interface to impose a selection of data retrieval constraints for constraining data operations on data records upon receipt of the alternate authorization credential from the aggregator client device 130 or any other client device.

In some examples, the generated alternate authorization credential may be time limited, such that the generated alternate authorization credential becomes invalid after a time limit elapses. That is, the processor may include in the data retrieval constraints an imposed time limit such that the generated alternate authorization credential may be identified as invalid when the processor receives the generated alternate authorization after the imposed time limit.

In some examples, when generating the alternate authorization credential for use by the data aggregation application 132, the processor may assign a particular time slot during which the processor may process data operation requests from the aggregator client device 130 upon receipt of the generated alternate authorization credential. For example, the processor may assign a time slot of 12 am to 2 am to the generated alternate authorization credential. In some examples, the processor may manage numerous generated alternate authorization credentials, such that a defined number of distinct alternate authorization credentials may be associated with any given time slot. For example, one thousand alternate authorization credentials may be associated with a given two hour time slot, and when the processor receives an alternate authorization credential outside the time slot range associated with that alternate authorization credential, data operation requests associated with that authorization credential may be deferred to a subsequent point in time. At least some of the assigned time slots may be staggered. For example, an alternate authorization credential which provides access to a first data record may only allow access during a first time window while an alternate authorization credential which provides access to a second data record may only allow access during a second time window which is not the same as the first time window.

At operation 340, the data record server 110 may transmit to the primary client device 120 the generated alternate authorization credentials. The alternate authorization credential may be an alphanumeric password, a signed authentication token for token-based authentication, or the like.

At operation 350, the primary client device 120 may transmit said alternate authorization credential to the aggregator client device 130 or any other client device to which delegation of data operations may be desirable. By providing the alternate authorization credential that is associated with data retrieval constraints, the primary client device 120 may effectively delegate a prescribed subset of data operations to the aggregator client device 130 so as to minimize risks inherent in otherwise providing the primary authorization credential. Recall that the primary authorization credential may be associated with one or more data records at the data record server 110 and the primary authorization credential may enable a client device to transmit data operation requests without associated data retrieval constraints to the data record server 110.

At operation 360, the aggregator client device 130 may transmit the alternate authorization credential to the data record server 110 for indicating to the data record server 110 that the aggregator client device 130 may conduct data operations on behalf of the primary client device 120. The aggregator client device 130 may include the data aggregator application 132 (FIG. 1), where the data aggregator application 132 may be configured to capture output from the data record server 110 by mimicking input of the primary client device 120. In some examples, the output may be captured from an Internet browser, a terminal access application, or other data output application. In some examples, the data aggregator application may utilize an application programming interface to extract data from an Internet website, where the website may be implemented using a text-based mark-up language.

At operation 370, the data record server 110 may receive the alternate authorization credential and may validate the alternate authorization credential. In some examples, the data record server 110 may validate the alternate authorization credential by determining whether the received alternate authorization credential corresponds to authorization credentials associated with one or more data records stored at the data record server 110. Further, at operation 370, the data record server 110 may determine whether the alternate authorization credential is associated with data retrieval constraints for constraining data operations on an identified data record stored at the data record server 110. In some examples, the alternate authorization credential may be received by the data record server 110 in combination with data operation requests from the aggregator client device 130. For example, the data operation requests may include data operations for retrieving data from one or more data records associated with the alternate authorization credential. Accordingly, at operation 370, the data record server 110 may be configured to output on an Internet browser, a terminal access application, or other data output application, a subset dataset in response to the data operation requests received from the aggregator client device 130. Examples of providing subset dataset in response to data operation requests received from the aggregator client device 130 will be described in the description that follows.

At operation 380, the data record server 110 may transmit the subset dataset associated with the identified one or more data records (e.g., the one or more data records that correspond to the alternate authorization credential). For example, the subset dataset may be identified based on data retrieval constraints associated with the alternate authorization credential that was received from the aggregator client device 130. Once the aggregator client device 130 collects data from data records, the aggregator client device 130 may conduct analytical operations on the data records and provide reports to respective primary client devices. For example, reports can include analysis relating to a breakdown of how currency or value in respective bank accounts are being spent or allocated. Other similar types of analysis on datasets are contemplated.

In some examples, upon receipt of a data signal including the alternate authorization credential from the aggregator client device 130, the data record server 110 may aggregate a subset dataset of the identified one or more data records defined by the data retrieval constraints. For example, the data record server 110 may retrieve, from data records stored in memory, data of particular data categories defined by the data retrieval constraints. The data retrieval constraints may be associated with the alternate authorization credential. As an illustrating example, the data retrieval constraints may identify a dataset category (e.g., personal bank account) of data that may be revealed and another dataset category (e.g., business bank account) of data that may not be revealed. Thus, upon receipt of the alternate authorization credential, the data record server 110 may be configured to retrieve data of a personal bank account (e.g., subset dataset) while refraining from retrieving data of a business bank account (e.g., not within the subset dataset).

Providing output of the subset dataset on an Internet browser, or other data output application may encumber data retrieval resources 116 (FIG. 1). It may be desirable to efficiently provide the output of the subset dataset when the data record server 110 receives the alternate authorization credential from the aggregator client device 130. Thus, in some examples, at operation 370, the data record server 110 may generate a streamlined graphical interface for displaying the subset dataset defined by the data retrieval constraints such that screen scraping of the subset dataset (by the aggregator client device 130) may occupy reduced resources. That is, providing the streamlined graphical interface may encumber reduced data retrieval resources 116 than if an un-streamlined graphical interface (which is the graphical interface provided when a primary authorization credential is used) was provided.

The streamlined graphical interface may suppress fanciful graphical features that otherwise would be provided for aesthetic appeal. In some examples, the streamlined graphical interface may output the subset dataset in a text-based order or listing. For example, one or more graphic that is included in the graphical interface provided when the primary authorization credential is used is omitted from the graphical interface that is provided when the alternate authorization credential is used. In another example, the home or landing page that is provided when the alternate authorization credential is used may differ from the home or landing page that is provided when the primary authorization credential is used. The home or landing page is the page that is immediately displayed after successful input of the authorization credential and the home or landing page that is provided when the alternate authorization credential is used may be more data-rich than the home or landing page that is provided when the primary authorization credential is used. For example, when the alternate authorization credential is used, more data from the data record may be displayed than when the primary authorization credential is used. By way of example, when the primary authorization credential is used the home or landing page may include options which allow a user to navigate to a page that provides data associated with the data records, whereas when the alternate authorization credential is used the data associated with the data records may be immediately provided.

Accordingly, in providing a streamlined graphical interface, the data record server 110 may endeavour to reduce the amount of data retrieval resources 116 for providing the subset dataset to the aggregator client device 130.

In another example, when the primary client device 120 transmits a request to generate an alternate authorization credential for use by a software module (see e.g., operation 320, FIG. 3), the primary client device 120 may specify a particular aggregator client device 130 to which to delegate data operations tasks. Thus, in some examples, at operation 330, the processor may additionally receive, from the primary client device 120, a client device identifier associated with the particular aggregator client device 130 for receiving the alternate authorization credential. Further, in lieu of operations 340 and 350 described above, the processor may transmit a data signal including the generated alternate authorization credential to the particular aggregator client device 130. In the foregoing example, the aggregator client device 130 may be pre-designated by the primary client device 120 as a delegated client device for data operations tasks and may receive the generated alternate authorization credential directly from the data record server 110.

As described in examples herein, the primary client device 120 may delegate data collection operations to the aggregator client device 130. The aggregator client device 130 may aggregate data from data records for providing analytical insight from datasets. For example, the primary client device 120 may be associated with an account data record at a retail banking institution (e.g., data record server 110, FIG. 1), with a credit card account data record at a credit card providing institution (e.g., a second data record server, not illustrated in FIG. 1), with an investment account data record at an investment broker institution (e.g., a third data record server, not illustrated in FIG. 1), and other account data records at like institutions. In some scenarios, it may be desirable to collect data from each of the account data records at the various institutions for providing analytical insight on currency or value flow analysis for that particular primary client device 120. The primary client device 120 may delegate the data collection and analytical insight operations to the aggregator client device 130, and the aggregator client device 130 may provide said data collection and analytical insight operations to numerous client devices. Accordingly, the aggregator client device 130 may initiate a high numerical volume of data operation requests at the data record server 110 and other data record servers, thereby encumbering a high volume of data retrieval resources 116 at respective data record servers. It may be desirable to provide a priority-based management method for managing data retrieval resources 116 at the data record server 110.

Figure 4:
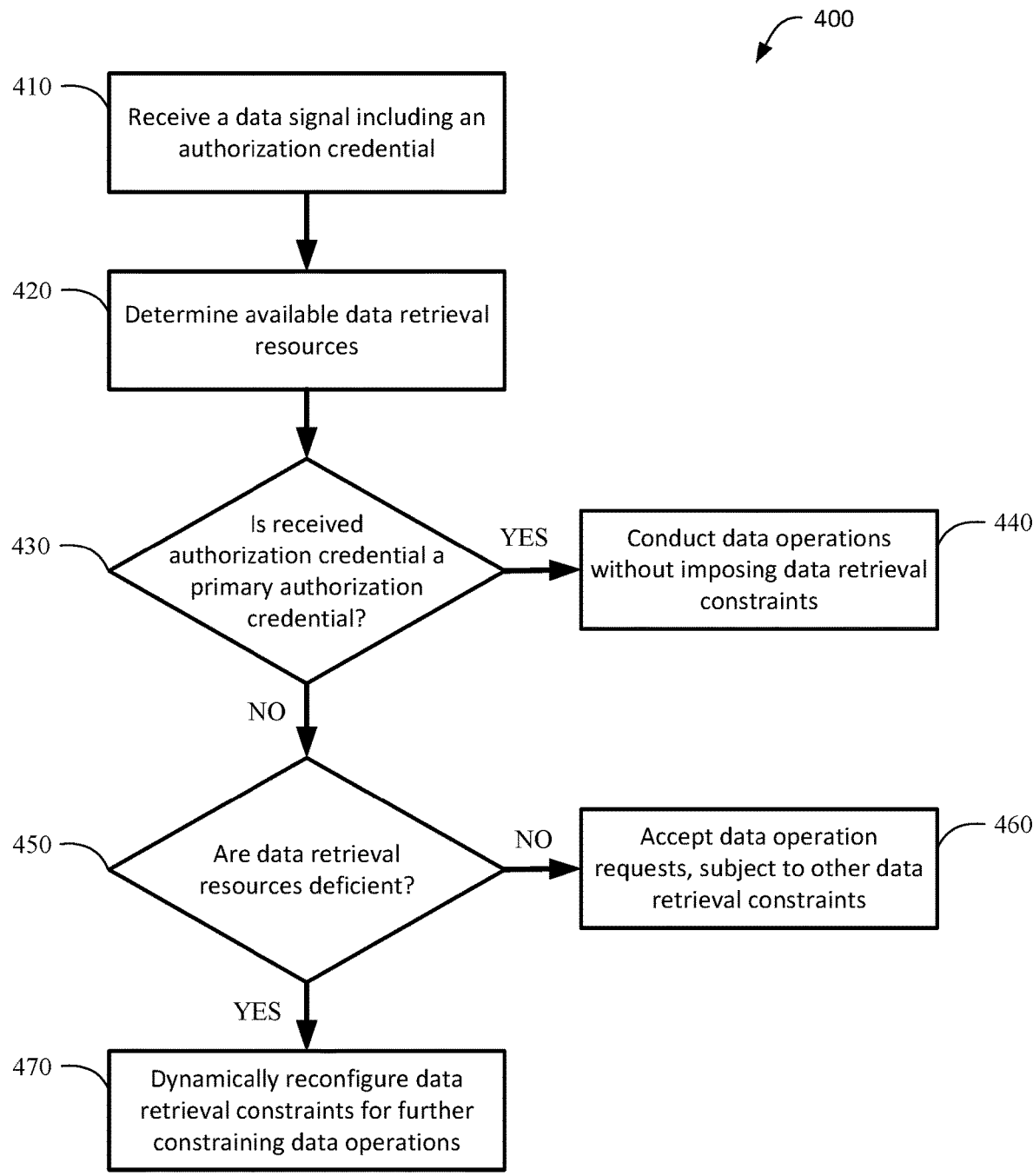
FIG. 4 illustrates, in flowchart form, a method of managing a data request interface of a data record server, in accordance with another example of the present application.

Reference is now made to FIG. 4, which illustrates, in flowchart form, a method 400 of managing the data request interface 112 (FIG. 1) of the data record server 110 of FIG. 1, in accordance with another example of the present application. The method 400 may include operations that may be carried out by one or more processors of the data record server 110. The method 400 may be implemented, at least in part, through processor-executable instructions associated with for example the data request interface 112. In some examples, one or more of the operations may be implemented via processor-executable instructions in other applications or in an operating system stored and executed on the data record server 110.

At operation 410, the processor may receive a data signal including an authorization credential from a client device. In some scenarios, the processor may receive a primary authorization credential from the primary client device 120 (FIG. 1). In some other scenarios, the processor may receive an alternate authorization credential from the aggregator client device 130 (FIG. 1), where the alternate authorization credential may indicate that data collection operations are delegated from the primary client device 120 (FIG. 1) to the aggregator client device 130.

At operation 420, the processor may determine a measure of available data retrieval resources 116 at the data record server 110. For example, the processor may determine the number of task threads that are in a queue or that are active. In another example, the processor may determine the amount of allocable memory available for tending to data collection operations. In another example, the processor may determine the amount of processor threads that may be available for aggregating subset datasets for providing to the one or more client devices. In another example, the processor may determine available capacity for responding to data record queries from authorized client devices. Other like methods of determining available data retrieval resources 116 may be contemplated.

At operation 430, the processor may determine whether the received authorization credential is one of: (1) a primary authorization credential associated with one or more data records; or (2) an alternate authorization credential associated with one or more data records.

If the received authorization credential is determined to be a primary authorization credential associated with one or more data records, at operation 440, the processor may conduct data operations without imposing data retrieval constraints on the identified one or more data records associated with the primary authorization credential.

If the received authorization credential is determined to be an alternate authorization credential associated with one or more data records, the processor may determine that the client device from which the alternate authorization credential is received may be the aggregator client device 130 (FIG. 1) whom is delegated with a data collection task.

In some scenarios, the received authorization credential may not match or align with authorization credentials associated with data records stored at the data record server 110. In the foregoing scenario, the processor may provide a notification that the received authorization credential may be invalid.

As illustrated in examples described herein, when an alternate authorization credential is received, the processor may execute operations for prioritizing data operation requests. For example, upon receiving an identified alternate authorization credential, the processor may prioritize data operation requests from client devices providing primary authorization credentials over data operation requests from other client devices providing alternate authorization credentials. That is, when a primary authorization credential is received, the processor may not apply data retrieval constraints to data operation requests received from the primary client device 120 (FIG. 1). However, when an alternate authorization credential is received, the processor may impose data retrieval constraints to data operation requests, thereby managing data retrieval resources 116 at the data record server 110.

In addition to determining that the received authorization credential is a primary authorization credential, at operation 450, the processor may determine whether data retrieval resources 116 may be deficient. As described herein, in some examples, the processor may determine that the data retrieval resources 116 may be deficient when the number of available processor threads or cycles for responding to data record queries may be less than a defined threshold or when the amount of allocable memory for providing output of data subsets may be less than a defined memory threshold. By determining whether data retrieval resources 116 may be deficient, the processor may prioritize data retrieval resources 116 for data requests associated with primary authorization credentials, and provide lower priority status for data requests associated with alternate authorization credentials. In some examples, providing lower priority status may include delaying response by the processor for data requests associated with alternate authorization credentials.

When the processor determines that the data retrieval resources 116 are not insufficient, at operation 460, the processor may not enact delayed response for received data operation requests. In some examples, even when the data retrieval resources 116 may not be insufficient and the processor may not enact delayed response for received data operation requests, the processor may apply other data retrieval constraints, such as providing output limited to particular subset datasets (e.g., providing personal bank account details and withholding business bank account details).

When the processor determines, however, that the data retrieval resources 116 are deficient, at operation 470, the processor may dynamically reconfigure the data retrieval constraints for further constraining data operations on one or more data records. That is, in response to determining that the data retrieval resources are deficient and upon receipt of the alternate authorization credential from the second client device, the processor may dynamically reconfigure the data retrieval constraints for further constraining data operations on the data record.

In some examples, the processor may be configured to dynamically reconfigure the data retrieval constraints by determining a time slot assignment to defer data operations on the one or more data records associated with the alternate authorization credential to a subsequent point in time. For instance, the data record server 110 may receive a high volume of data operation requests for data records between the hours of 9 am to 6 pm during a working week, but may receive proportionately lower volume of data operation requests between the hours of 2 am and 5 am during the work week. Accordingly, in some scenarios, the processor may be configured to reconfigure data retrieval constraints for deferring data operation requests received from the aggregator client devices 130 (e.g., client devices that may be tasked with making high volume of data operation requests) to a time period (e.g., 2 am to 5 pm) when the data retrieval resources 116 may be relatively more plentiful.

In some examples, the processor may be configured to identify numerous data types in a data record, where providing each data type may require varying units of data retrieval resources 116 (FIG. 1). The processor may be configured to assign time slots to the respective data types, such that providing data requiring greater units of data retrieval resources 116 may be deferred to a later point in time while providing data requiring lesser units of data retrieval resources 116 may be executed promptly. For example, data requiring greater units of data retrieval resources 116 may be nested at lower levels of a document object model (DOM) structure, whereas data requiring lesser units of data retrieval resources 116 may be nearer to a top level of the DOM structure of an Internet webpage.

In some examples, the processor may determine that data retrieval resources may be deficient when a data signal including an alternate authorization credential is received during a peak time range. For example, a peak time range may be defined as the period of time between 9 am and 6 pm during the days from Monday to Friday. Thus, in some examples, upon receipt of the data signal including the alternate authorization credential from the second client device during a peak time range, the processor may: (1) dynamically defer data operation requests from the aggregator client device 130 from which the alternate authorization credential was received; or (2) transmit a notification, via the data request interface, to the aggregator client device 130 for communicating that data operations requested for the associated data record are deferred to a subsequent point in time.

In some examples, in response to determining that the data retrieval resources 116 may be deficient, the processor may execute memory allocation operations for additionally allocating memory to expand the data retrieval resources 116. For example, the processor may determine the number of alternate authorization credentials that have been generated (and issued) to client devices or the processor may determine a rate of received requests for generating alternate authorization credentials. Further, the processor may subsequently allocate additional data retrieval resources 116 based on analysis of the number of generated alternate authorization credentials. That is, the processor may conduct operations for balancing the data retrieval resources 116 based on the number of generated alternate authorization credentials and based on an assessment of data retrieval resources 116.

In some examples, based on historical data capturing trends relating to when the processor may receive data operations requests from client devices, the processor may execute operations for predicting data retrieval resources 116 that may be required for various time slots for any given day of the week. When executing operations for predicting data retrieval resources 116 that may be required, the processor may further reconfigure data retrieval constraints (e.g., deferring particular data operations requests from aggregator client devices) for balancing data retrieval resource 116 demand and requirements.

Examples in the foregoing description may distinguish primary authorization credentials from generated alternate authorization credentials for imposing, by a data record server 110, data retrieval constraints to data operation requests received from one or more client devices. That is, the processor of the data record server 110 may apply data retrieval constraints in response to receiving an alternate authorization credential associated with a particular data record. Further, the processor may determine whether data retrieval resources are deficient in response to receiving the alternate authorization credential associated with the particular data record for dynamically managing data retrieval resources 116 for responding to data operation requests.

In some scenarios, however, a primary client device 120 (FIG. 1) may fail to provide an alternate authorization credential associated with a data record for use by a data aggregation application 132 of the aggregator client device 130. That is, the primary client device 120 may not request an alternate authorization credential and may simply share the primary authorization credential with the aggregator client device 130. In the foregoing scenario, data retrieval constraints that may depend on identifying a type of authorization credential could be thwarted. It may be desirable to provide a method for proactively identifying client devices with delegated data operation tasks and whom were provided primary authorization credentials.

Figure 5:
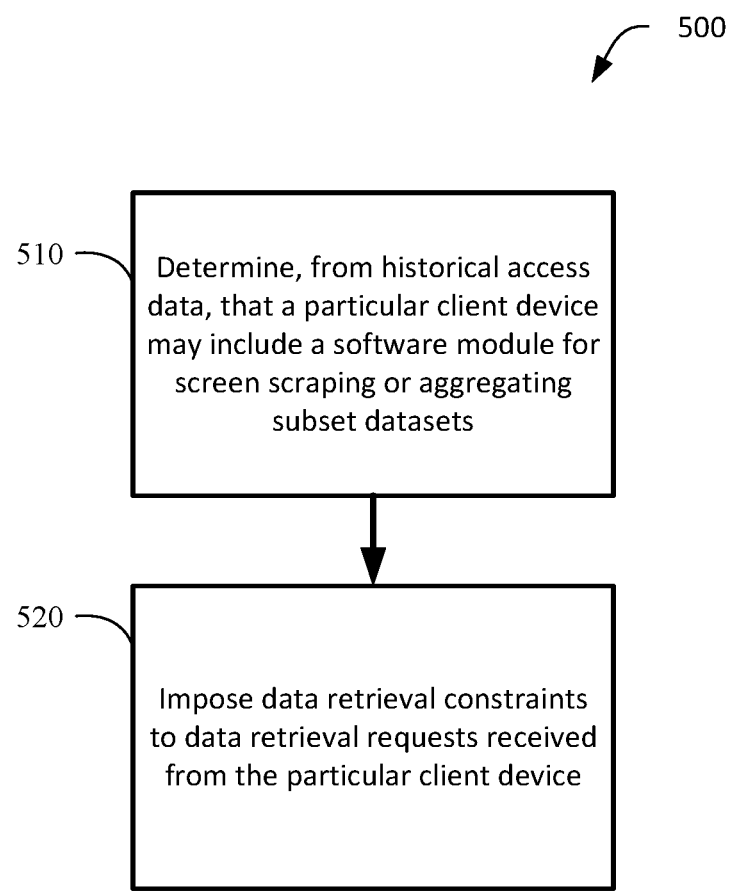
FIG. 5 illustrates, in flowchart form, a method of managing a data request interface of a data record server, in accordance with another example of the present application.

Reference is now made to FIG. 5, which illustrates, in flowchart form, a method 500 of managing the data request interface 112 (FIG. 1) of the data record server 110 of FIG. 1, in accordance with another example of the present application. The method 500 may include operations that may be carried out by one or more processors of the data record server 110. The method 500 may be implemented, at least in part, through processor-executable instructions associated with for example the data request interface 112. In some examples, one or more of the operations may be implemented via processor-executable instructions in other applications or in an operation system stored and executed on the data record server 110.

As described, the data record server 110 may receive authorization credentials from a plurality of client devices. Client devices may be assigned a unique or defined client device identifier for distinguishing a client device from another client device. In some scenarios, the processor may receive primary authorization credentials. In some other scenarios, the processor may receive alternate authorization credentials. When a given client device having a unique device identifier, such as the aggregator client device 130 (FIG. 1), successively transmits primary authorization credentials (e.g., from primary client devices that delegated data operations tasks to the aggregator client device 130), the data record server 110 may execute the operations of the method 500 for proactively identifying the aggregator client device 130 as a device tasked with data collection, thereby encumbering data retrieval resources 116 (FIG. 1) of the data record server 110.

At operation 510, the processor may determine, from historical access data, that a particular client device may include a software module for screen scraping or aggregating subset datasets. For example, the processor may determine (e.g., based on a comparison with a defined threshold) that numerous distinguishable primary authorization credentials have been received from the aggregator client device 130 having a predefined client device identifier. That is, each distinguishable primary authorization credential may be associated with a respective data record.

When the processor determines that numerous distinguishable primary authorization credentials have been received from the aggregator client device 130, the processor may determine that the aggregator client device 130 may be conducting operations of a software module for screen scraping or aggregating subset datasets. In some examples, the processor may determine that the aggregator client device 130 may be conducting operations for screen scraping when a threshold number of primary authorization credentials have been received from the aggregator client device 130. That is, the processor may monitor the number of primary authorization credentials received from the particular aggregator client device 130 for deducing that the aggregator client device 130 may include a software module for screen scraping or aggregating subset datasets. Thus, in some scenarios, the data record server 110 may be configured to limit data operation requests from screen scraping or aggregation application modules, such that data retrieval resources 116 may be prioritized for data operation requests from primary client devices 120 (FIG. 1).

At operation 520, the processor may impose data retrieval constraints to data retrieval requests from the particular client device. Continuing with the foregoing example, upon identifying that the threshold number of primary authorization credentials have been received from the particular aggregator client device 130, the processor may impose data retrieval constraints to data retrieval requests from the particular aggregator client device 130. That is, the processor may execute learning operations for proactively identifying aggregator client devices that may be utilizing primary authorization credentials for screen scraping or aggregating subset datasets.

Accordingly, the processor may amend data retrieval constraints such that the processor may permit or constrain data operation requests based on identification of client devices based on an associated unique device identifier. For example, the processor may permit data operation requests from a subset of client devices having a predefined client device identifier, and the processor may constrain data operation requests from another subset of client devices not having the predefined client device identifier. In some examples, the unique device identifier may be a static internet protocol (IP) address or a media access control (MAC) address. Other unique device identifiers for associating with respective client devices may be contemplated.

Figure 6:
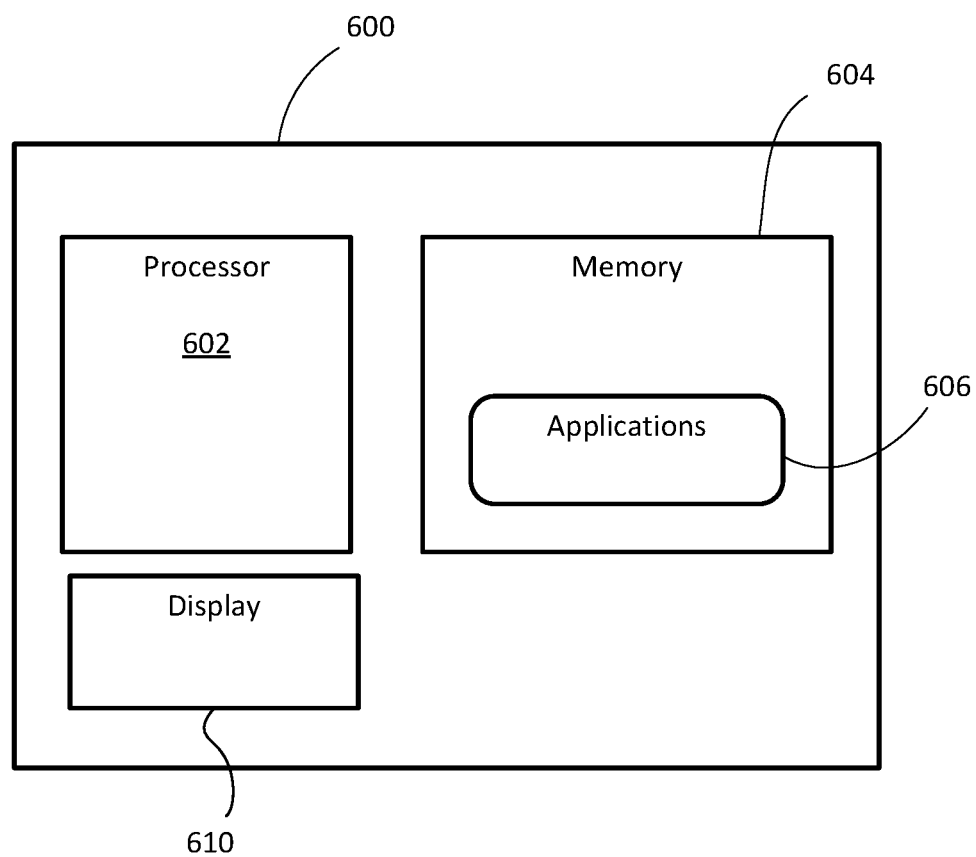
FIG. 6 illustrates, in simplified block diagram form, a client device, in accordance with an example of the present application.

Reference is now made to FIG. 6, which illustrates, in simplified block diagram form, a client device 600, in accordance with an example of the present application. The client device 600 may be a primary client device 120 (FIG. 1) or an aggregator client device 130 (FIG. 1). The client device 600 may include one or more processors 602 and memory 604. The memory 604 may store processor-executable software applications 606 that may include an operating system to provide basic device functions. The software applications 606 may also contain instructions implementing the operations and functions of the methods described herein. For example, in the case of the client device 600 being the example primary client device 120 (FIG. 1), the software applications 606 can include the primary data record manager application 122 (FIG. 1). In the case of the client device 600 being the example aggregator client device 130 (FIG. 1) described herein, the software applications 606 can include the data aggregation application 132 (FIG. 1).

The client device 600 may also include a display interface or a display 610. The display 610 can be any suitable display, such as a liquid crystal display (LCD), an e-ink/e-paper display, or the like. In some examples, the display 610 may be a touchscreen display.

In some examples, the client device 600 may be a portable electronic device, such as a smartphone, a personal computer, a laptop computer, a tablet computer, a notebook computer, a hand-held computer, a personal digital assistant, a portable navigation device, a mobile phone, a wearable computing device (e.g., a smart watch, a wearable activity monitor) or any other type of computing device that may be configured to store data and software instructions, and execute software instructions to perform example operations described herein. The client device 600 may be associated with one or more users which may interact with the client device 600. For example, a user may operate the client device 600 such as by way of a provided graphical user interface whereby the client device 600 may perform one or more operations consistent with the examples described herein.

Figure 7:
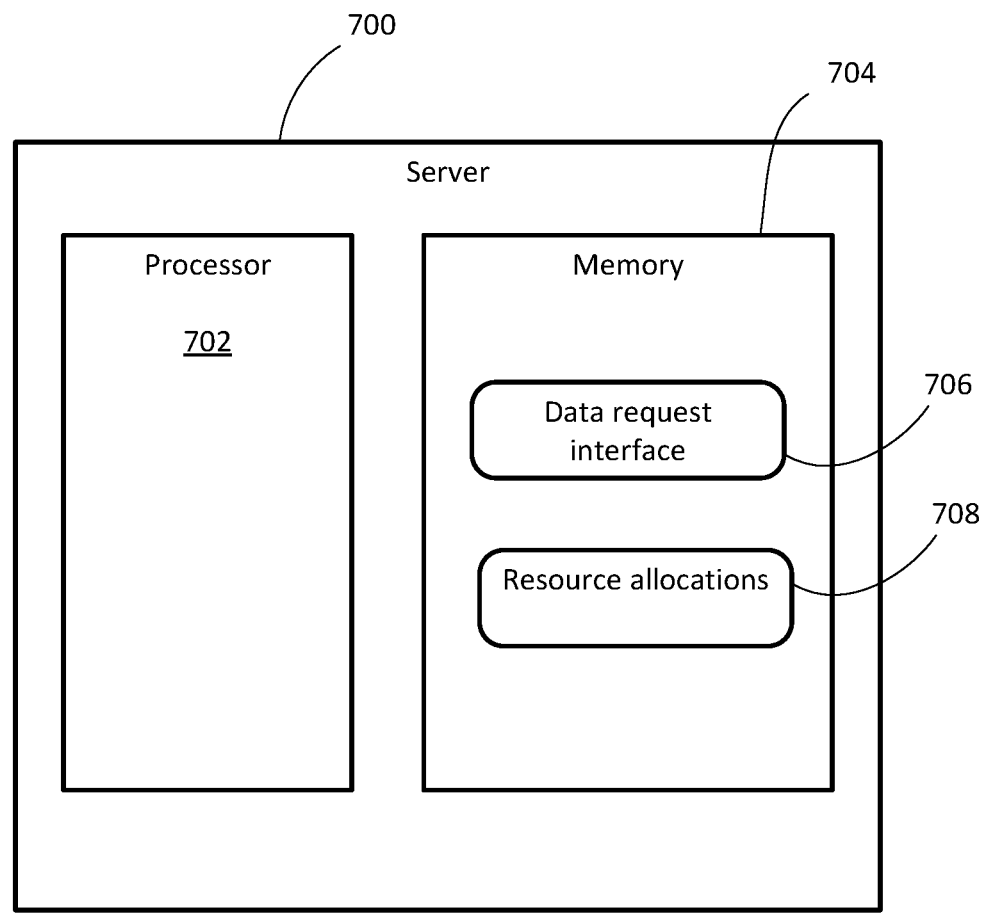
FIG. 7 illustrates, in simplified block diagram form, a server, in accordance with an example of the present application.

FIG. 7 illustrates, in simplified block diagram form, a server 700, in accordance with an example of the present application. The server 700 may be the data record server 110 of FIG. 1 and may include one or more processors 702 and memory 704. The memory 704 may be associated with the data request interface 706 and the resource allocations 708 described with references to FIG. 1 and may include instructions implementing the operations and functions of the data record server 110 (FIG. 1) described herein. That is, the memory 704 may store processor-executable software that include instructions implementing the operations and functions of the data record server 110 (FIG. 1) described herein. The memory 704 may also include data records 114 (FIG. 1), such as the first data record 114*a*, the second data record 114*b*, the third data record 114*c*, or any other data records.

Example embodiments of the present application are not limited to any particular operating system, system architecture, mobile device architecture, server architecture, or computer programming language.

It will be understood that the applications, modules, routines, processes, threads, or other software components implementing the described method/process may be realized using standard computer programming techniques and languages. The present application is not limited to particular processors, computer languages, computer programming conventions, data structures, or other such implementation details. Those skilled in the art will recognize that the described processes may be implemented as a part of computer-executable code stored in volatile or non-volatile memory, as part of an application-specific integrated chip (ASIC), etc.

Certain adaptations and modifications of the described embodiments can be made. Therefore, the above discussed embodiments are considered to be illustrative and not restrictive.

What is claimed is:

1. A system for managing a data request interface, the system comprising:
    a communications module for communicating over a network;
    a processor coupled to the communications module; and
    a memory associated with the data request interface and coupled to the processor, the memory storing processor-executable instructions that, when executed, cause the processor to:
        receive, from a first client device and via the communications module, a first signal including a primary authorization credential associated with a data record;
        receive, from the first client device and via the communications module, a second signal including a request to generate an alternate authorization credential for use by a software module associated with a second client device, the second client device associated with a third-party providing a service to the first client device, the alternate authorization credential associated with data retrieval constraints constraining data operations performed on the data record;
        generate the alternate authorization credential;
        configure the data request interface to impose the data retrieval constraints constraining data operations performed on the data record by limiting user interface access to data of the data record upon receipt of the alternate authorization credential from the second client device, the data retrieval constraints including providing read-only access to the data record by preventing the second client device from transferring units of value from the data record to another data record;
        send, via the communications module to at least one of the first client device and the second client device, a third signal including the alternate authorization credential;

receive, via the communications module and from the second client device, a fourth signal including the alternate authorization credential; and in response to receiving the fourth signal including the alternate authorization credential from the second client device, generate a streamlined graphical interface for displaying a subset dataset defined by the data retrieval constraints such that screen scraping of the subset dataset by the second client device occupies reduced resources.

2. The system of claim 1, wherein the data retrieval constraints identify a subset dataset from the data record, and wherein the instructions, when executed, further cause the processor to:

receive, from the first client device and via the communications module, selection of the subset dataset from the data record for including in the data retrieval constraints.

3. The system of claim 1, wherein the data retrieval constraints include a time constraint permitting data operations on the data record at a specified time.

4. The system of claim 1, wherein the instructions, when executed, further cause the processor to:

determine available data retrieval resources of the data request interface for responding to data operations; and in response to determining that the data retrieval resources of the data request interface are deficient and upon receipt of a fifth signal including the alternate authorization credential from the second client device, dynamically reconfigure the data retrieval constraints for further constraining data operations on the data record.

5. The system of claim 4, wherein the processor is configured to dynamically reconfigure the data retrieval constraints by determining a time slot assignment to defer data operations on the data record by the second client device to a subsequent point in time.

6. The system of claim 1, wherein the instructions, when executed, further cause the processor to:

upon receipt of a sixth signal including the alternate authorization credential from the second client device during a peak time range, transmit a notification, via the data request interface, to the second client device for communicating that data operations for the data record are deferred to a subsequent point in time.

7. The system of claim 1, wherein the data retrieval constraints permit data operation requests from a subset of client devices having a predefined client device identifier and constrain data operation requests from client devices not having the predefined client device identifier.

8. The system of claim 7, wherein the instructions, when executed, further cause the processor to:

determine, from historical access data, that a particular client device may include a software module for screen scraping or aggregating subset datasets; and impose data retrieval constraints to data retrieval requests received from the particular client device.

9. The system of claim 1, wherein the instructions, when executed, further cause the processor to:

receive, from the first client device, a client device identifier associated with the second client device for receiving the alternate authorization credential, and wherein sending via the communications module to the at least one of the first client device and the second client device the third signal including the alternate authorization credential comprises transmitting the third signal including the alternate authorization credential to the second client device.

10. The system of claim 1, wherein the data retrieval constraints impose a time limit such that the alternate authorization credential becomes invalid after the time limit elapses.

11. The system of claim 1, wherein the software module includes at least one of a screen scraper application or an aggregator application.

12. The system of claim 1, wherein the alternate authorization credential is at least one of a password or a token.

13. A computer-implemented method for managing a data request interface, the method comprising:

receiving, from a first client device, a first signal including a primary authorization credential associated with a data record;

receiving, from the first client device, a second signal including a request to generate an alternate authorization credential for use by a software module associated with a second client device, the second client device associated with a third-party providing a service to the first client device, the alternate authorization credential associated with data retrieval constraints constraining data operations performed on the data record;

generating the alternate authorization credential;

configuring the data request interface to impose the data retrieval constraints constraining data operations performed on the data record by limiting user interface access to data of the data record upon receipt of the alternate authorization credential from the second client device, the data retrieval constraints including providing read-only access to the data record by preventing the second client device from transferring units of value from the data record to another data record;

sending to at least one of the first client device and the second client device a third signal including the alternate authorization credential;

receiving, via the communications module and from the second client device, a fourth signal including the alternate authorization credential; and in response to receiving the fourth signal including the alternate authorization credential from the second client device, generating a streamlined graphical interface for displaying a subset dataset defined by the data retrieval constraints such that screen scraping of the subset dataset by the second client device occupies reduced resources.

14. The method claimed in claim 13, further comprising:

determining available data retrieval resources of the data request interface for providing data operations; and in response to determining that the data retrieval resources of the data request interface are deficient and upon receipt of a fifth signal including the alternate authorization credential from the second client device, dynamically reconfiguring the data retrieval constraints for further constraining data operations on the data record.

15. The method claimed in claim 14, wherein dynamically reconfiguring the data retrieval constraints for further constraining data operations of the data record includes determining a time slot assignment to defer data operations on the data record by the second client device to a subsequent point in time.

16. The method claimed in claim 13, further comprising:

upon receipt of a sixth signal including the alternate authorization credential from the second client device during a peak time range, transmitting a notification, via the data request interface, to the second client device for communicating that data operations for the data record is deferred to a subsequent point in time.

17. The method claimed in claim 13, further comprising:
receiving, from the first client device, a client device identifier associated with the second client device for receiving the alternate authorization credential,
and wherein sending to the at least one of the first client device and the second client device the third signal including the alternate authorization credential comprises transmitting the third signal including the alternate authorization credential to the second client device.

18. A non-transitory computer-readable storage medium storing instructions for managing a data request interface, the instructions, when executed by a processor of a computer system, cause the computer system to:
receive, from a first client device, a first signal including a primary authorization credential associated with a data record;
receive, from the first client device, a second signal including a request to generate an alternate authorization credential for use by a software module associated with a second client device, the second client device associated with a third-party providing a service to the first client device, the alternate authorization credential associated with data retrieval constraints constraining data operations performed on the data record;
generate the alternate authorization credential;
configure the data request interface to impose the data retrieval constraints constraining data operations performed on the data record by limiting user interface access to data of the data record upon receipt of the alternate authorization credential from the second client device, the data retrieval constraints including providing read-only access to the data record by preventing the second client device from transferring units of value from the data record to another data record;
send to at least one of the first client device and the second client device a third signal including the alternate authorization credential;
receive, via the communications module and from the second client device, a fourth signal including the alternate authorization credential; and
in response to receiving the fourth signal including the alternate authorization credential from the second client device, generate a streamlined graphical interface for displaying a subset dataset defined by the data retrieval constraints such that screen scraping of the subset dataset by the second client device occupies reduced resources.

19. The system of claim 1, wherein the streamlined graphical interface includes at least one of displaying the subset dataset in a text-based order or supressed graphical features.

20. The method of claim 13, wherein the streamlined graphical interface includes at least one of displaying the subset dataset in a text-based order or supressed graphical features.

* * * * *